Figure 3:
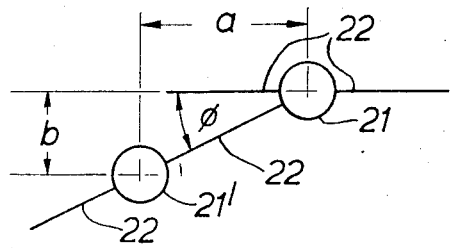

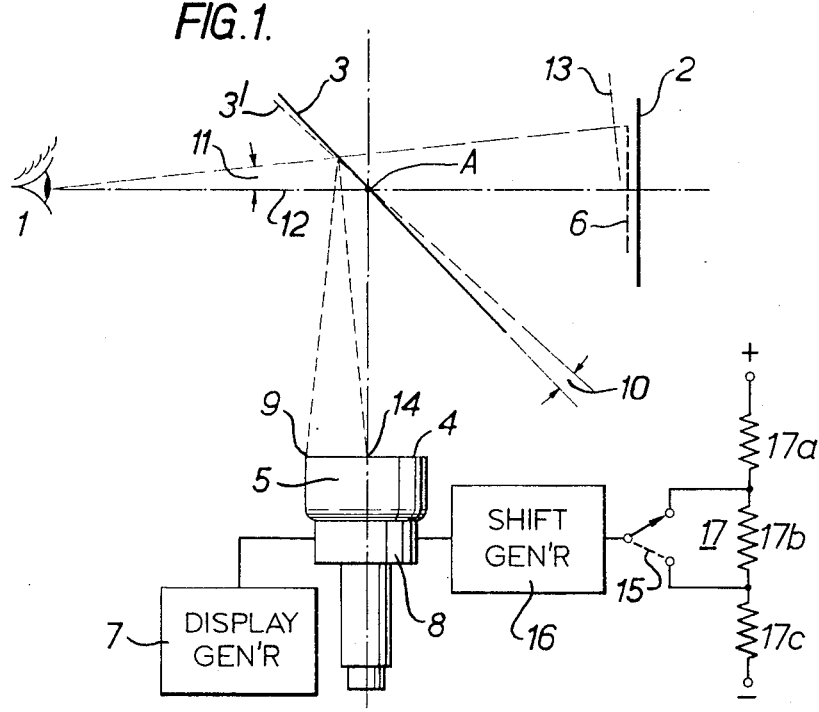
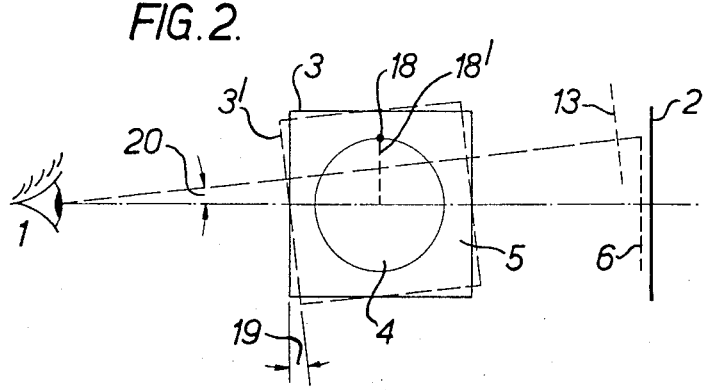

Sept. 20, 1966    D. C. BOWLES ETAL    3,274,545
ELECTRONIC DISPLAY APPARATUS
Filed July 15, 1963    4 Sheets-Sheet 4

INVENTORS
DONALD CLIVE BOWLES
DEREK RAYMOND BURROWS

BY Hane and Nydick
ATTORNEYS

United States Patent Office 3,274,545
Patented Sept. 20, 1966

3,274,545
ELECTRONIC DISPLAY APPARATUS
Donald Clive Bowles, Purley, and Derek Raymond Burrows, London, England, assignors to Rank-Bush Murphy Limited, London, England, a company of Great Britain
Filed July 15, 1963, Ser. No. 294,920
9 Claims. (Cl. 340—24)

This invention relates to electronic display apparatus in which an optical system is used to present to an observer an image of symbolic information displayed on a cathode ray tube, so that this information may be assimilated by the observer without re-focusing or moving his eyes from part of another scene viewed simultaneously through the same optical system. Arrangements of this kind are made use of to display to the operator of a vehicle information assisting him in his control of the vehicle. One embodiment of such an optical system comprises a partial reflector, a cathode ray tube so placed that a display produced on its screen is visible to the operator of a vehicle in said reflector as he views a scene external to said vehicle, and one or more lenses disposed between the cathode ray tube and the reflector, forming an optical system having a focal length such that the screen of the cathode ray tube appears to the operator as being at a finite distance in space. The characteristics of such optical systems are necessarily such that the image of the screen of the cathode ray tube can be viewed only within a narrow range of positions defined by a cone having an apical angle of usually less than 20°.

It is an object of the present invention to provide electronic display apparatus in which disadvantages of known display apparatus may be overcome.

More specifically it is an object of the invention to provide electronic display apparatus in which information projected from the screen of a cathode ray tube may be made visible to an observer over a wider angular range than heretofore.

The invention provides electronic display apparatus comprising in combination: a cathode ray tube having a luminescent screen; means for producing a luminous display upon said screen; a partial reflector mounted for movement about an axis; an optical path whereby an image of said screen may be viewed in said reflector; potential control means operated by movement of said reflector; shift means producing a displacement of said display on said screen; and means for applying said controlled potential to said shift means, thereby producing a displacement of said image when said reflector is moved such as to compensate for said movement of said reflector.

Although the invention is hereinafter particularly described with reference to embodiments of electronic display apparatus suitable for presenting flight data to the pilot of an aircraft, the scope of the present invention is not to be considered as limited to apparatus of this kind. The invention may be used in other applications where it is required to superimpose symbolic information upon the field of view of an operator. The requirements of symbolic display in aircraft are such that all features of the present invention may readily be considered in this application and it is for this reason that embodiments of apparatus for this purpose are selected for description.

Figure 6:
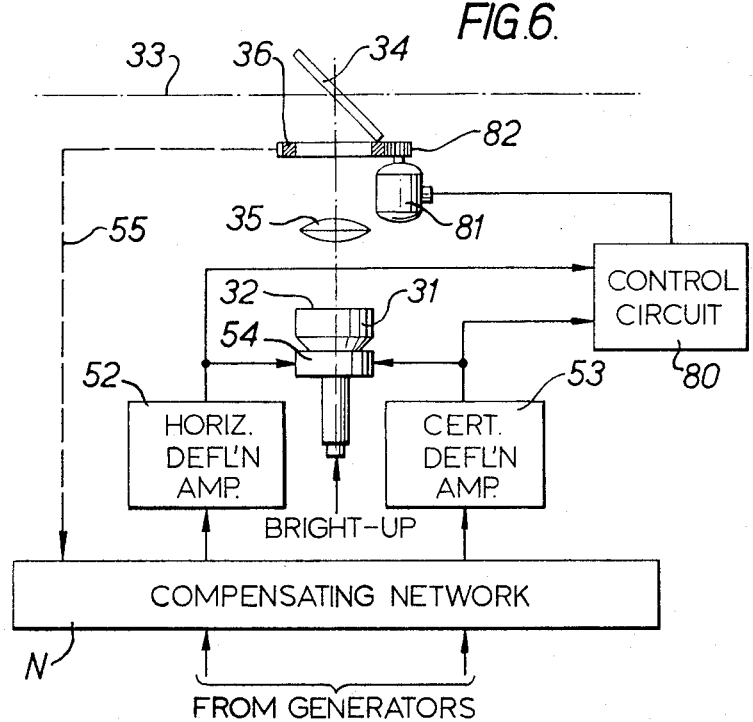
Figure 4:
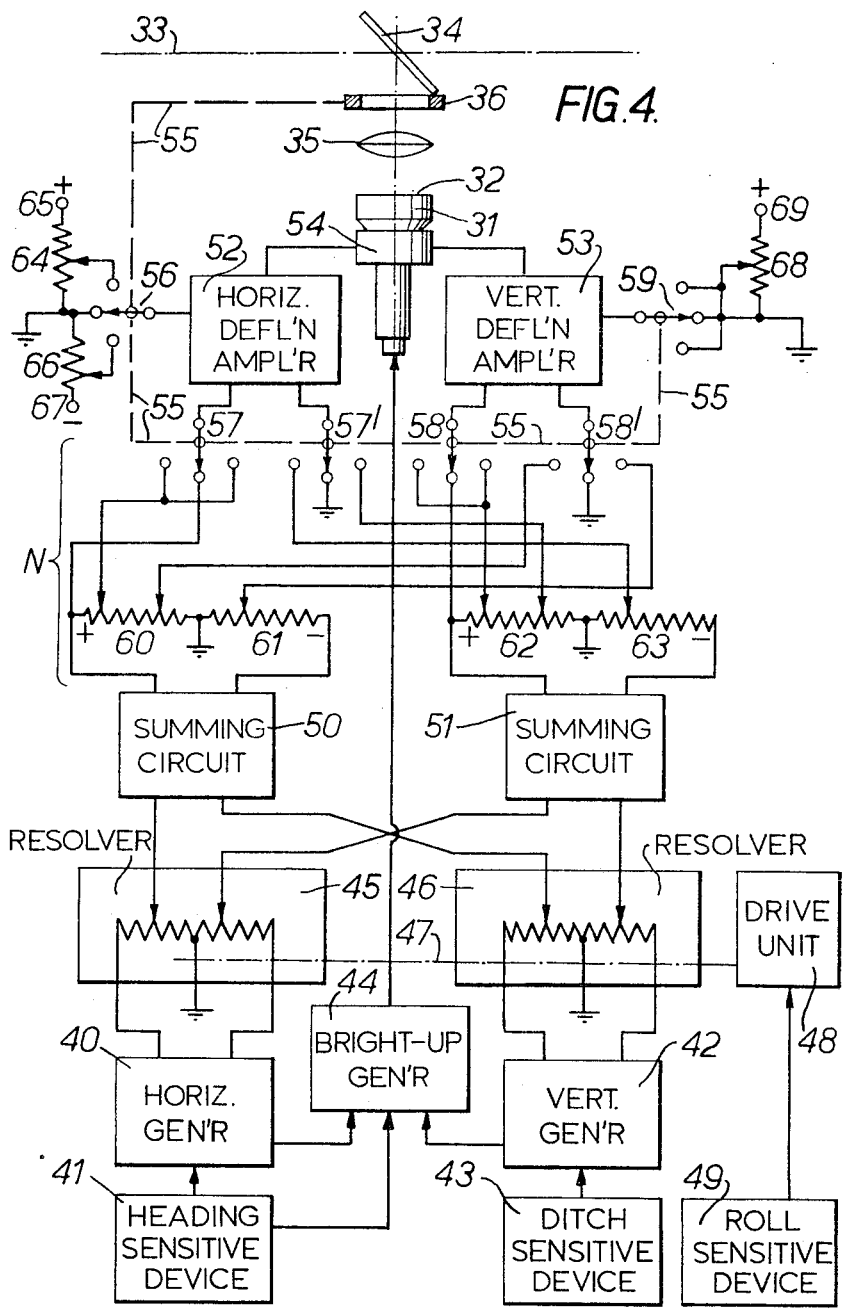
Figure 5:
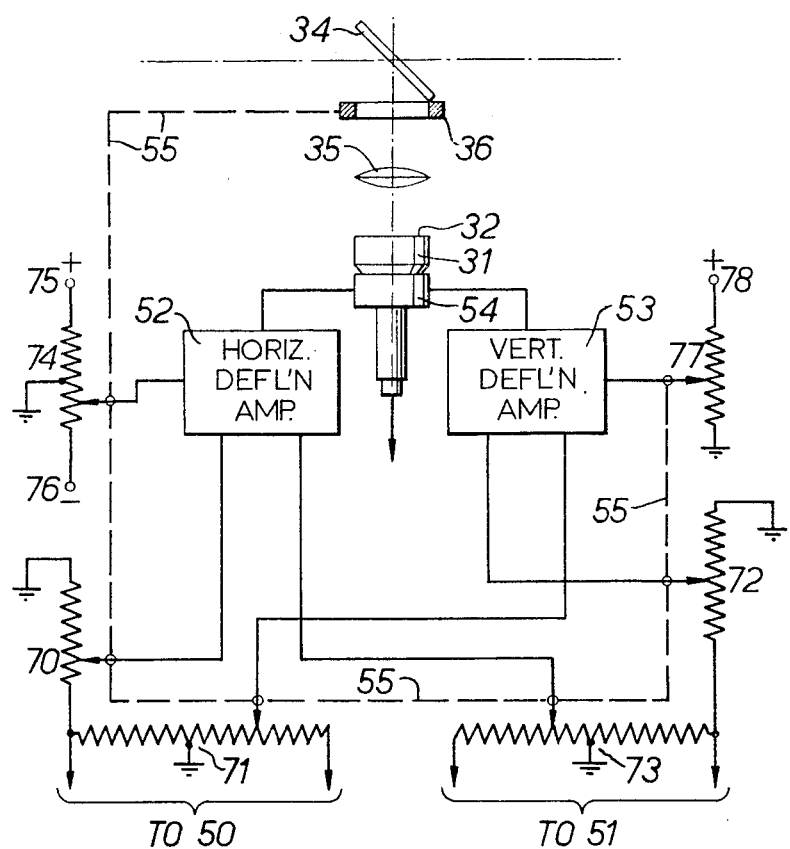

The invention will now be more particularly described with reference to the accompanying drawings, comprising FIGURES 1 to 6, in the several figures of which like elements are designated by like reference numerals, and of which:

FIGURE 1 is a schematic diagram illustrating the principle of electronic display apparatus according to the invention, FIGURE 2 is a schematic diagram illustrating a modification of the apparatus described in relation to FIGURE 1, FIGURE 3 is a diagram illustrating undesired displacements of a displayed image which may arise in apparatus according to the invention, FIGURE 4 is a schematic diagram illustrating one embodiment of apparatus for carrying out the present invention, FIGURE 5 is a partial schematic diagram of another embodiment of apparatus for carrying out the invention, and FIGURE 6 is a partial schematic diagram of yet another embodiment of apparatus for carrying out the invention.

FIGURE 1 illustrates a simple embodiment of electronic display apparatus embodying the present invention. An observer, whose eye only is shown at 1, views an object 2 by way of a partial reflector 3. The screen 4 of a cathode ray tube 5 is also visible to the observer by reflection in reflector 3 and is effectively so positioned that its image 5 appears to the observer to lie in the plane of object 2. Where object 2 is at a great distance from observer 1, as where apparatus according to the invention is employed for the guidance of an aircraft, object 2 may be effectively at a finite distance in space and the image of cathode ray tube screen 4 may be optically removed to this distance by the interposition of a collimating lens in the optical path between tubes 5 and reflector 3.

It is obvious that the apparent movement of the display over the surface of object 2 is limited by the size of the cathode ray tube and/or of the optical system employed with it. It is an object of the present invention to remove this limitation and to this end reflector 3 is mounted so as to be movable about an axis A perpendicular to the plane of the drawing and passing through the point at which the optical axes meet in the plane of the reflector. It is arranged that movement of the reflector controls the position of the display on the tube screen so that the image of the display appears stationary upon object 2 when the reflector is so moved.

Suppose, for example, that the spot produced upon the screen of tube 5 is controlled by currents developed in a deflection generator 7 and fed to a deflection yoke 8 and that this spot has reached the position 9 at which any further movement will cause it to pass off the tube screen. In accordance with the invention the reflector 3 is now displaced about axis A into a position 3' by rotation through an angle 10 which is conveniently equal to the angle 11 by which the image of the spot appears to the observer to be displaced from the optical axis 12. The effect of this displacement of reflector 3 is that the image of the screen 4 of tube 5 is displaced to the position indicated by dotted line 13, which has been displaced somewhat towards reflector 3 from its correct position for the sake of clarity in illustration. If the image of the spot on the screen is to remain unmoved, then it is now necessary for the spot to be displaced from point 9 to point 14 at the centre of the screen. This may be done by means of a switch 15, arranged by suitable mechanical means to be operated simultaneously with the movement of the mirror, which applies to a shift generator 16 feeding currents to yoke 8 one or other of the two potentials derived from a potential divider 17 formed by a train of three resistors 17a, 17b, 17c connected across a direct voltage supply represented by terminals + and —. It will be obvious to those skilled in the art that it is also possible to arrange for continuous movement of reflector 3 to produce a continuous change in the potential applied to shift generator 16 such as to yield a compensatory displacement of the display on the screen of tube 5. This may be done by arranging that displacement of reflector 3 produces a corresponding movement of the slider of a potentiometer controlling the potential applied to shift generator 16.

It is thus apparent that the present invention has great utility in extending the effective movement of a cathode ray tube display in a direction defined by the common plane of the optical axes of the system described in relation to FIGURE 1 of the drawings. It is, however, possible to make use of the invention to extend laterally the scope of movement of a display superimposed upon an object by a reflective optical system.

FIGURE 2 illustrates apparatus similar to that shown in FIGURE 1, but shown in plan. It will be appreciated from the description above in relation to FIGURE 1 that a displacement of the spot on the screen 4 of cathode ray tube 5 to point 18 will bring the display to the limit of its possible movement. If now reflector 3 is rotated about the axis of cathode ray tube 5 through an angle 19 which is equal to half the angle 20 by which the image of spot 18 appears to the observer to be displaced from the axis, then the image of cathode ray tube screen 4 will be displaced to a position 13 such that if the image of spot 18 is to appear to the observer as remaining fixed in space the spot itself must be deflected back to the centre of the screen as indicated by broken line 18'. The possible movement of the displayed spot is thus greatly increased.

If the display to be observed were only a simple circular spot, the arrangements described would be adequate.

It must be pointed out that the arrangement of FIGURE 2 introduces certain unwanted displacements of the display, which are more readily understood by reference to FIGURE 3, which shows schematically the appearance to the observer of a particular composite display with the reflector in each of the positions illustrated in FIGURE 2, in the absence of any correction applied to the cathode ray tube.

The displayed symbol illustrated in FIGURE 3 consists of a circle 21 accompanied by aligned, laterally projecting lines 22. With reflector 3 of FIGURE 2 in its normal position the symbol appears to the operator with the lateral lines disposed horizontally. When reflector 3 is rotated to the position shown by the broken outline 3' then the displayed symbol will not only suffer the desired lateral displacement $a$ but will also suffer an undesired downward displacement $b$ and a rotational displacement through an angle $c$. These unwanted displacements may be eliminated by arranging that the signals applied to the cathode ray tube to produce the display are appropriately modified.

Apparatus according to one embodiment of the invention, illustrated in FIGURE 4, includes provision for producing appropriate modifications of the display to correct for the movement of the reflector about a vertical axis. The apparatus here described is intended to assist the pilot in controlling an aircraft. To this end there is displayed to the pilot a symbol which may be of the form illustrated in FIGURE 3. The means adopted for the display of the symbol to the pilot comprises a cathode ray tube 31, upon the screen 32 of which a luminous representation of the symbol is produced. This symbol is made visible to the pilot of an aircraft by interposing in his normal line of sight, represented by chain line 33, a partial reflector 34 in which the pilot sees reflected an image of screen 32. It will usually be advantageous to interpose in the optical path between screen 32 and reflector 34 a collimating lens system, represented in the drawing for convenience in illustration as a simple lens 35, such that the virtual image of screen 32 is seen by the pilot as being at a definite distance in space.

To make use of the present invention to extend the apparent range of movement of the display, reflector 34 is mounted for movement about the axis of cathode ray tube 31. To this end reflector 34 is carried upon a mounting ring 36 carried in suitable bearings which are conventional and do not require illustration. As has already been explained in relation to FIGURE 3, movement of reflector 34 about the tube axis gives rise to certain unwanted displacements of the displayed symbol, which may be eliminated as hereinafter described.

It is first of all necessary to explain the means by which the symbol is produced upon the screen of cathode ray tube 31. The components of deflection of the electron beam of cathode ray tube 31 which, when the aircraft is in level flight, deflect the beam horizontally, are produced by a horizontal component generator 40, the operation of which is in part controlled by a device 41 sensitive to the heading of the aircraft. Such devices are well known in the field of aviation and need no further description, save that they provide a voltage proportional to the deviation of the aircraft from a predetermined heading and of one or other polarity in accordance with the direction of this deviation. Generator 40 may comprise suitable circuits of known kind to generate at spaced intervals firstly a signal comprising one or more complete cycles of a sinewave, the amplitude of which corresponds to the diameter of the circle 21 in the symbol shown in FIGURE 3, and secondly a linear sawtooth voltage corresponding to deflection of the electron beam across the whole extent of the screen 32. The effect of any deviation from the correct heading detected by device 41 is arranged to be the addition to the output of generator 40 of a shift component producing an appropriate displacement of the symbol in the horizontal direction on the screen of tube 31.

Similarly, a vertical component generator 42, controlled in part by a pitch sensitive device 43, is arranged to generate a vertical deflection voltage composed of two components; during the time when horizontal generator 40 is producing its sinusoidal component, vertical generator 42 produces a similar sinusoidal component phase displaced from that of generator 40 by an angle of 90°, so that under the combined influence of the two sinusoidal components the electron beam traces circle 21 on the screen 32 of cathode ray tube 31. The mean value of this sinusoidal signal is controlled by a signal derived from a pitch-sensitive device 43 of known kind which applies to generator 42 a voltage proportional to any deviation of the aircraft from the horizontal and of appropriate polarity to show upward or downward inclination of the aircraft. During the periods when horizontal generator 40 is producing its sawtooth waveform, vertical generator 42 produces only the constant voltage determined by the control signal applied to it from pitch sensitive device 43.

The outputs of the horizontal and vertical generators, if applied directly to control respectively the horizontal and vertical components of deflection of the electron beam of cathode ray tube 31, would produce on the cathode ray tube screen 32 a symbol comprising a circle pierced by a horizontal line, the lateral position of the circle varying in accordance with deviations of the aircraft heading from a desired direction and the vertical position of the display varying with the attitude of the aircraft in elevation. To produce the symbol shown in FIGURE 3 it is arranged that the electron beam of cathode ray tube 31 is suppressed save when a bright-up signal is applied to the tube from a bright-up generator 44 by way of a lead 45. Bright-up generator 44 is controlled by signals from both the horizontal and vertical generators 40 and 42, so that it yields a bright-up signal only when deflection control signals are being produced by those generators, and also by the heading-sensitive device 41, so that the horizontal line piercing the circle 21 is broken into the two short lines 22.

The arrangement thus far described is insensitive to the position of the aircraft in bank. To introduce this component of information the outputs from the horizontal and vertical generators 40, 42 are applied to respective sine-cosine resolvers 45, 46. Each of these devices comprises a pair of potentiometers ganged together to yield outputs whose amplitudes are respectively proportional to the sine and to the cosine of the position of the control shift. The symbol here adopted does not adequately represent the operation of these devices but in conjunction with the foregoing description is thought to be well understood by those skilled in the art. The two resolvers 45, 46 are controlled by a common shaft represented by chain line 47. This shaft is operated by a resolver drive unit 48 controlled by a roll-sensitive device 49 of known type. Details of such control arrangements are well known in the art and are not thought to require further description herein.

The like-phased outputs of each of resolvers 45 and 46 are added in pairs in respective summing circuits 50, 51 and the summed signals are then applied to control respective horizontal and vertical deflection amplifiers 52, 53 feeding currents to appropriate windings on a deflection yoke 54 associated with cathode ray tube 31. For the purposes of the invention summing circuits 50, 51 are each arranged to provide like outputs in each polarity.

In accordance with the invention the connexions from summing circuits 50, 51 to deflection generators 52, 53 are not taken directly, but pass through a switched resistance network indicated generally by reference N comprising switches 56 to 59 and potential dividers 60 to 63, the nature and purpose of which will be described in detail below. In the normal condition of the apparatus, that is with reflector 34 in its normal position, this network has no effect on the operation of the apparatus, which is then as follows.

When the aircraft is in normal flight, that is, when the roll is zero, the outputs from the horizontal and vertical generators 40, 41 will pass wholly to the respective horizontal and vertical deflection amplifiers 52, 53, so that the symbol resulting from the deflections produced will be traced on the screen 32 of cathode ray tube 31 with the line 22 horizontal as viewed by the pilot. If the aircraft banks, resolvers 45, 46 will supply appropriate fractions of the outputs of generators 40, 41 to deflection amplifiers 52, 53 to produce a corresponding tilt of the displayed symbol.

The apparatus thus far described provides for the display of symbolic information to the pilot but does not allow the required correction for movement of reflector 34. Assume for the sake of example that reflector 34 is shifted about the axis of cathode ray tube 31 to a position such that the undesired displacements $a$, $b$ and $\phi$ of the displayed symbol which are illustrated in FIGURE 3 have been produced. The means whereby these displacements are compensated will now be described. When reflector 34 is displaced about the tube axis its mounting ring 36 is also moved, and by suitable mechanical means, indicated by broken line 55, sets a number of switches to appropriate positions. The several switches thus operated comprise switches 56, 57, 57', 58, 58' and 59 and their functions are as follows:

Switch 56 normally connects to earth an input to the horizontal deflection amplifier 51. When reflector 34 is turned, switch 56 connects this input terminal to an adjustable bias potential, either positive or negative according to the direction of movement of reflector 34, which produces a corresponding leftward or rightward shift in the electron beam of cathode ray tube 31, such as to compensate for the unwanted displacement $a$ of the optical image introduced by the mirror movement. The positive bias is obtained from a potentiometer 64 connected between earth and a suitable voltage source represented by a terminal 65, while the negative bias required for the opposite direction of movement of the reflector is obtained from another potentiometer 66 connected between earth and a suitable source of negative potential represented by a terminal 67.

Switches 57, 57' control the input connexions to horizontal deflection amplifier 51. When reflector 34 is in its normal position these connexions are taken directly from the output of summing circuit 49. When reflector 34 is turned, however, the switches 57, 57' change the input connexions to horizontal deflection amplifier 51 which now receives from the summing circuit 49 a component $A \cos \phi$, where A is the amplitude of the output signal from summing circuit 49 and $\phi$ is the angle through which the reflector has turned, and from summing circuit 50 a component $B \sin \phi$, where B is the amplitude of the output from circuit 50. The input now received by horizontal deflection amplifier 52 is therefore $A \cos \phi + B \sin \phi$. At the same time switches 58, 58' produce a similar change in the signal applied to the vertical deflection amplifier, which now receives a signal $B \cos \phi + A \sin \phi$.

In the case of aircraft navigational aids the main requirement is to compensate for drift in azimuth but it is envisaged that for some aeronautical requirements a shift may be required in elevation. This direction of shift requires less compensation, since the display is not rotated and requires only to be subjected to a displacement in the vertical direction introduced by the use of a simple switch and potentiometer arrangement such as that shown at 59, 68, 69.

It is emphasized that the embodiment specifically described above is given by way of example only and that the use of the invention is by no means limited to a navigational aid in aircraft, since it provides a convenient method of presenting transient information to an operator viewing a scene effectively at infinity so as to allow the operator a wider field of view of the information field than has hitherto been possible, nor is it limited to the movement of the reflector between predetermined positions since it is envisaged that a modification of the circuit could be employed to enable the movements of the reflector to be continuously variable within the limits of an angle of about 40°. The arrangements necessary to enable a continuous movement of the reflector to be compensated are illustrated by FIGURE 5, which shows those portions of apparatus similar to that described in relation to FIGURE 4 which require modification.

Here the outputs from summing circuits 50, 51 are applied in each case to a standard and to a centre-tapped potentiometer, 70, 71 and 72, 73 respectively. These potentiometers are controlled by suitable conventional mechanical means actuated by movement of reflector mounting ring 36 so that the voltages tapped from them vary with the reflector position as described below. Potentiometer 70 is arranged to provide to horizontal deflection amplifier 52 a voltage related to the amplitude A of the output from summing circuit 50 by the cosine of the angle of deviation of reflector 34. Centre-tapped potentiometer 71 applies to vertical deflection amplifier 53 a component representing the output of summing circuit 50 multiplied by the sine of the angle of deflection $\phi$; potentiometer 72 applies to vertical deflection amplifier 53 a component proportional to the output of summing circuit 51 multiplied by the cosine of the angle of deviation and centre-tapped potentiometer 73 applies to horizontal deflection amplifier 52 a component representing the output of summing circuit 51 multiplied by the sine of the angle of deviation. Hence as in FIGURE 4 the input of deflection amplifier 52 is at all times equal to $A \cos \phi + B \sin \phi$, while the input to vertical deflection amplifier 53 is equal to $B \cos \phi + A \sin \phi$. The centre-tapped potentiometers 71, 73 driven from the oppositely poled outputs of summing circuits 50, 51 are necessary because the sine of the angle of deviation changes in sign according to the direction of rotation of the reflector from its normal position.

In addition a shift voltage of appropriately varying polarity and magnitude is applied to horizontal deflection amplifier 52 from a centre-tapped potentiometer 74 fed from appropriate positive and negative voltage sources represented by terminals 75, 76, while shift is also applied to vertical deflection amplifier 53 from a potentiometer 77 connected to an appropriate voltage source represented by terminal 78.

In a further embodiment of the invention the movement of the reflector may be arranged to be effected automatically when the lateral displacement of the displayed symbol has become sufficiently large to cause viewing difficulties. One form of apparatus suitable for this purpose is schematically illustrated by FIGURE 6. Here once again a cathode ray tube 31 has a symbol displayed on its screen 32 for the guidance of a pilot viewing the display apparently at infinity by reflexion in reflector 34 and by way of an optical system 35 producing a vertical image of the screen at a finite distance in space. The display is produced by deflecting the beam of the cathode ray tube by appropriate currents applied to a deflection yoke 54 from horizontal and vertical deflection amplifiers 52, 53. To derive a control potential representative of the displacement of the symbol from the centre of the screen 32 the outputs from deflection amplifiers 52, 53 are applied to a control circuit 80 in which they are separately rectified and the resultant direct voltages are added. When the potential thus obtained exceeds a predetermined magnitude in either polarity, control circuit 80 is arranged to provide a motor current which is applied to a motor 81. Motor 81 is connected by way of gearing 82 with the mounting ring 36 which carries reflector 34, so that this reflector is turned through an angle such as to provide, by optical displacement of the image of the cathode ray tube screen 32, sufficient scope for further displacement of the displayed symbol. Electrical compensation for the rotation of reflector 34 is provided by a compensating network N which conveniently comprises the components 56 to 69 of FIGURE 4, or the components 70 to 78 of FIGURE 5, according as motor 81 is arranged to rotate reflector 34 to predetermined positions or to any position which reduces the control potential derived as described above to a value below a predetermined limit.

In either case the circuitry contained within control circuit 80 is readily devised by those skilled in the art and is not thought to require detailed description here.

Furthermore it is envisaged that a mutual displacement may be effected between the reflector and collimating lens such that a wider angle of view is provided both in azimuth and elevation. This mutual displacement may be effected under the control of a cam arrangement which may move the reflector alone or the collimating lens and cathode ray tube unit alone or both the reflector and the unit may be moved, one in azimuth and the other in elevation.

We claim:

1. Electronic display apparatus comprising in combination: a cathode ray tube having a luminescent screen; means for producing a luminous display upon said screen; a partial reflector mounted for movement about an axis; an optical path whereby an image of said screen may be viewed in said reflector; electrical potential control means operated by movement of said reflector; shift means producing a displacement of said display on said screen; and means for applying said controlled potential to said shift means, thereby producing a displacement of said image when said reflector is moved such as to compensate for said movement of said reflector.

2. Electronic display apparatus according to claim 1, wherein said reflector is mounted for continuous movement and in which said electrical potential control means comprises a potentiometer coupled to said reflector.

3. Electronic display apparatus according to claim 1, wherein said reflector is mounted for movement into a plurality of predetermined positions and in which said electrical potential control means comprises a switch, a resistance network and means coupling said switch to said reflector in order to set said switch into a plurality of states corresponding to said predetermined positions of the reflector.

4. Electronic display apparatus according to claim 1 in which said axis is perpendicular to the plane containing said optical path and the axis of said cathode ray tube, and in which said shift means operates to displace said display across said screen in the direction of said plane.

5. Electronic display apparatus according to claim 1 comprising additionally an optical system disposed between said reflector and said screen, said optical system being such as to produce a virtual image of said screen at a finite distance in space.

6. Electronic display apparatus comprising, in combination: A cathode ray tube having a luminescent screen; means for producing an electron beam within said tube; means for deflecting said electron beam over said screen, said means comprising first and second deflection amplifiers respectively controlling deflection of said beam in first and second mutually perpendicular directions; an optical system having an axis, said optical system producing a virtual image of said screen at a finite distance in space; a reflector inclined to said axis, said reflector having an initial position and being mounted for movement from said initial position by rotation about said axis through an angle $\phi$; generator means for producing first and second signals having respective amplitudes A and B; adjustable circuit means coupled to said reflector to effect adjustment thereof, said circuit means being responsive to first and second input signals and operating to produce first and second output signals representing either said input signals or modified combinations of said input signals, dependent upon the state of adjustment thereof; means for applying said signals as input signals to said adjustable circuit means; means for applying said output signals from said adjustable circuit means to said deflection amplifiers to develop a display on said screen, whereby apparent rotation of said image in space as said reflector is moved about said axis is compensated.

7. Electronic display apparatus according to claim 6, in which said adjustable circuit means comprises means for deriving from said input signals first and second modified signals defined by the expression $A \cos \phi + B \sin \phi$ and $B \cos \phi + A \sin \phi$ respectively, together with switch means coupled to said reflector and poerative when said reflector is in said initial position to apply said first and second input signals to said deflection amplifiers and when said reflector is moved through said angle $\phi$ to apply said modified signals to said deflection amplifiers respectively.

8. Electronic display apparatus for displaying to the pilot of an aircraft information relating to the flight thereof, said apparatus comprising, in combination: a cathode ray tube having a luminescent screen; means for generating an electron beam within said tube and for deflecting said beam over said screen to produce a luminous display thereon; a device sensitive to the heading of said aircraft and yielding a heading voltage representative of said heading; a voltage controlled horizontal deflection generator yielding signals apt to control one component of said deflection of said electron beam; means for applying said heading voltage to control said horizontal deflection generator; a device sensitive to the pitch of said aircraft and yielding a pitch voltage representative of said pitch; a voltage controlled vertical deflection generator yielding signals apt to control another component of deflection of said electron beam; means for applying said pitch voltage to control said vertical deflection generator; first and second sine-cosine resolvers each yielding two output voltages proportional to an input voltage as the sine and as the cosine respectively of the angular position of a control shaft; a common shaft coupling said control shafts; a voltage controlled drive unit coupled to said common shaft; a device sensitive to the roll of said aircraft and yielding a roll voltage representative of said roll; means for applying said roll voltage to said drive unit whereby said common shaft rotates in proportion to the roll of said aircraft; means for applying the outputs of said horizontal and vertical deflection generators each to a respective one of said resolvers; like summing circuits for combining applied signals and yielding output signals having respective amplitudes A and B; means for applying to each said summing circuit the like-phased signals from each of said resolvers; horizontal and vertical deflection amplifiers controlling said deflection of said electron beam in mutually perpendicular directions; a reflector having an initial position and mounted for deviation about an axis through an angle $\phi$ into a predetermined other position; means for viewing said screen by reflection in said reflector; individual cosine divider means yielding output signals proportional to input signals as the cosine of said angle $\phi$; means for applying the output of each said summing circuit to an individual one of said cosine dividers; individual sine dividers means each yielding signals proportional to input signals as the sine of said angle $\phi$; means for applying the output of each said summing circuit to the input of an individual one of said sine dividers; means for combining the output of the cosine divider fed with one of said output signals with the output of the sine divider fed with the other of said output signals, and for combining the output of the cosine divider fed with said other output signal with the output of said sine divider fed with said one of said output signals to obtain modified signals represented respectively by the expressions $A \cos \phi + B \sin \phi$ and $B \cos \phi + A \sin \phi$; and switch means coupled to said reflector for operation thereby, said switch means operating when said reflector is in said initial position to connect the output of each said summing circuit directly to a respective one of said deflection amplifiers, and operating when said reflector is in said other position to apply said modified signals each to a respective one of said deflection amplifiers.

9. Electronic display apparatus comprising, in combination: a cathode ray tube having a luminescent screen; means for producing an electron beam within said cathode ray tube; means for deflecting said electron beam over said screen to trace a luminous symbol thereon; an optical system having an axis, said optical system producing a virtual image of said screen at a finite distance in space; a reflector inclined to said axis, said reflector being mounted for movement about said axis; voltage-controlled means for producing said movement of said reflector; means for producing an electrical potential representative of the maximum deflection of said electron beam; limiter means responsive to an applied signal and yielding an electrical control potential only when said applied signal exceeds a predetermined magnitude representing a predetermined displacement of said symbol from the centre of said screen; means for applying said representative electrical potential to said limiter means; means for applying said electrical control potential to said voltage-controlled means, whereby movement of said reflector about said axis is produced only when the displacement of said symbol from the centre of said screen exceeds a predetermined magnitude; shift means producing a displacement of said symbol on said screen; electrical potential control means operated by movement of said reflector; and means for applying said controlled electrical potential to said shift means thereby producing when said reflector is moved a displacement of said image such as to compensate for movement of said reflector.

References Cited by the Examiner
UNITED STATES PATENTS

| | | | |
|---|---|---|---|
| 2,251,984 | 8/1941 | Cleaver et al. | 178—7.92 X |
| 2,852,974 | 9/1958 | Nobles | 88—2.3 X |

FOREIGN PATENTS

| | | |
|---|---|---|
| 857,671 | 1/1961 | Great Britain. |

NEIL C. READ, *Primary Examiner.*

A. H. WARING, *Assistant Examiner.*